(12) United States Patent
Allen

(10) Patent No.: US 9,995,090 B2
(45) Date of Patent: Jun. 12, 2018

(54) COMPLETION METHOD FEATURING A THERMALLY ACTUATED LOCK ASSEMBLY FOR A TELESCOPING JOINT

(71) Applicant: BAKER HUGHES INCORPORATED, Houston, TX (US)

(72) Inventor: Jason A. Allen, Houston, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 909 days.

(21) Appl. No.: 14/491,664

(22) Filed: Sep. 19, 2014

(65) Prior Publication Data
US 2016/0084018 A1  Mar. 24, 2016

(51) Int. Cl.
| *E21B 17/07* | (2006.01) |
| *E21B 23/00* | (2006.01) |
| *F16B 1/00* | (2006.01) |
| *E21B 34/00* | (2006.01) |

(52) U.S. Cl.
CPC .............. *E21B 17/07* (2013.01); *E21B 23/00* (2013.01); *F16B 1/0014* (2013.01); *E21B 2034/007* (2013.01)

(58) Field of Classification Search
CPC .... E21B 17/07; E21B 2034/007; E21B 23/00; F16B 1/0014
See application file for complete search history.

(56) References Cited

U.S. PATENT DOCUMENTS

| 5,018,581 A * | 5/1991 | Hall ........................ E21B 17/07 166/105 |
| 6,508,437 B1 | 1/2003 | Davis et al. |
| 8,366,368 B2 | 2/2013 | Sundholm |
| 8,403,064 B2 | 3/2013 | Allen |
| 2009/0205833 A1* | 8/2009 | Bunnell .................. E21B 23/00 166/373 |
| 2010/0163250 A1* | 7/2010 | Schultz .................... E21B 17/07 166/381 |
| 2010/0215424 A1 | 8/2010 | Crookston et al. |
| 2010/0229610 A1 | 9/2010 | Garrigan et al. |
| 2010/0247271 A1* | 9/2010 | Sundholm ............. F16B 1/0014 411/517 |
| 2012/0279701 A1* | 11/2012 | Doane ................. E21B 33/1291 166/217 |
| 2013/0199791 A1* | 8/2013 | Hill, Jr. .................. E21B 34/06 166/332.8 |

* cited by examiner

*Primary Examiner* — Robert E Fuller
*Assistant Examiner* — Christopher J Sebesta
(74) *Attorney, Agent, or Firm* — Steve Rosenblatt

(57) ABSTRACT

A completion method involves a telescoping joint in the completion string that needs to be locked when pumping fluid through it as part of the completion method. The joint is locked with two locks and one is thermally activated using a shape memory locking member to handle the stresses from component contraction. The setting of the thermally actuated lock occurs when the temperature is lowered during pumping. At other times the temperature of well fluid defeats the thermal lock leaving a non-thermal lock actuated until such time that the telescoping joint can be used in production. The non-thermal lock is defeated so allow normal telescoping action during production. The non-thermal lock is defeated with string manipulation or pressure or other ways depending on its design.

16 Claims, 1 Drawing Sheet

COMPLETION METHOD FEATURING A THERMALLY ACTUATED LOCK ASSEMBLY FOR A TELESCOPING JOINT

FIELD OF THE INVENTION

The field of the invention is completion methods where telescoping components need to be held together during some operations that also involve other steps that would defeat a single mechanical or hydraulically released lock and more particularly an application involving a telescoping joint.

BACKGROUND OF THE INVENTION

Some completion assemblies require a telescoping joint to be operative when production begins but for the purposes of the completion the joint needs to retain a fixed length. During completion operations can occur that place significant stresses on a lock that for example operates on a shear principle. Certain pumping operations introduce significantly cooler fluids into the completion assembly that would defeat shear pins or rings or cause unwanted axial translations. Various mechanical manipulations are also accomplished during the completion or applications and removal of pressure such that a single lock that is defeated with stress, movement or pressure cycles would release prematurely. What is needed and provided by the present invention is a dual locking system so that a telescoping joint can be retained by a thermally actuated lock that locks when a cool fluid is pumped that would cause significant thermal stresses of contraction and at the same time that very same lock releases after the cool fluid pumping ceases so that when the joint is needing to telescope it can do so. The non-thermal lock can be defeated as needed, either before or after pumping operations, for normal telescoping operation.

Thermal locks using shape memory components are described in U.S. Pat. Nos. 8,366,368; 6,508,437; 20100215424 and 20100229610.

The method contemplates a pair of locks where there is a thermally operated lock coupled with a non-thermally operated lock. Both operate on a telescoping joint to hold the telescoping components in a fixed relation for running in. As the joint is exposed to warm well fluids the thermally operated lock releases leaving the joint still locked with the non-thermal lock so that various steps in the method that can involve string manipulation or application or removal or pressure can take place. When it comes time to pump relatively cold fluid through the joint that would create substantial stress on the non-thermal lock to the point of likely failure, the drop in temperature engages the thermal lock so that the non-thermal lock is protected. Alternatively the pumping can cause unwanted translation if the non-thermal lock was already defeated. Translation induced by pumping could affect tool positions or, in case of a system shown in U.S. Pat. No. 8,403,064, the translation could prematurely activate another device. Subsequent removal of the cold fluid allows the warming of the thermal lock to the point of defeat after the stress induced by the cold pumping fluid disappears. At that point when the telescoping joint is needed to be operative the non-thermal lock can be defeated such as by mechanical manipulation or applied pressure. As stated above, the non-thermal lock can also be defeated ahead of the pumping. These and other aspects of the present invention will be more apparent to those skilled in the art from a review of the detailed description of the preferred embodiment and the associated drawings while recognizing that the full scope of the invention is to be determined from the appended claims.

SUMMARY OF THE INVENTION

A completion method involves a telescoping joint in the completion string that needs to be locked when pumping fluid through it as part of the completion method. The joint is locked with two locks and one is thermally activated using a shape memory locking member to handle the stresses from component contraction. The setting of the thermally actuated lock occurs when the temperature is lowered during pumping. At other times the temperature of well fluid defeats the thermal lock leaving a non-thermal lock actuated until such time that the telescoping joint can be used in production. The non-thermal lock is defeated so allow normal telescoping action during production. The non-thermal lock is defeated with string manipulation or pressure or other ways depending on its design.

DETAILED DESCRIPTION OF THE PREFERRED EMBODIMENT

Figure 1:
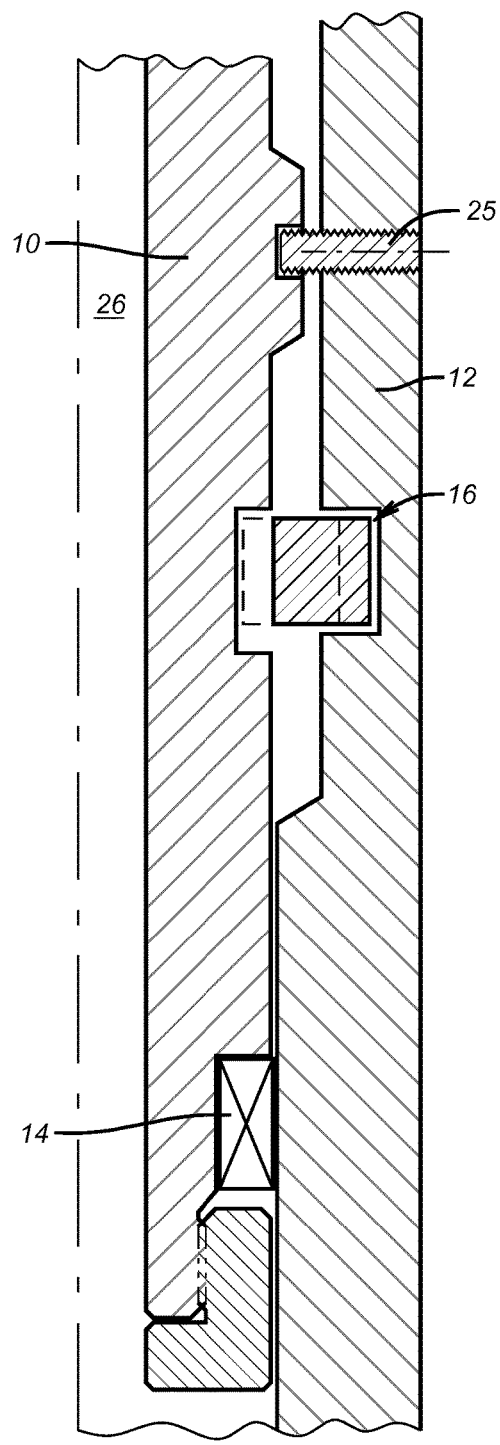
FIG. 1 is a section view that shows the movement of the thermal lock between locked and unlocked positions on the telescoping joint.
Figure 2:
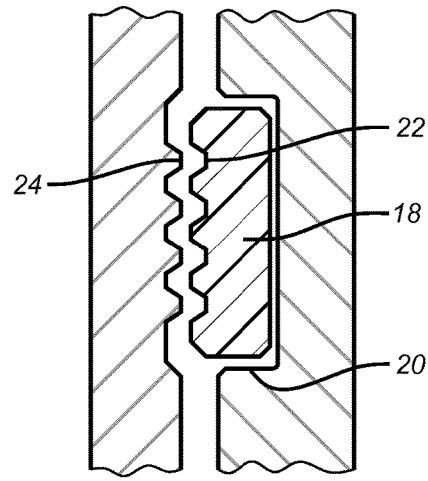
FIG. 2 is a detailed view of the thermal lock in the unlocked position.
Figure 3:
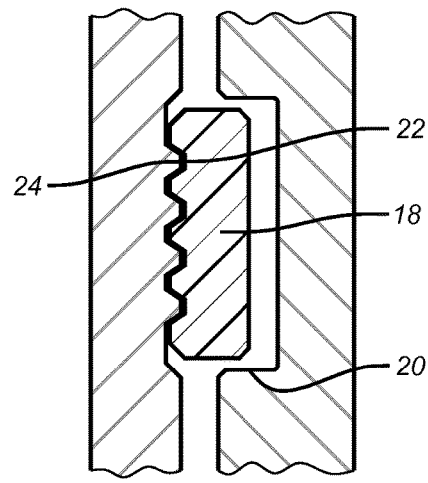
FIG. 3 is the view of FIG. 2 with the thermal lock in the locked position.

FIG. 1 shows components 10 and 12 that telescope with respect to each other with seal 14 maintaining the integrity of the connection. The telescoping joint can be part of a bottom hole assembly such as described in U.S. Pat. No. 8,403,064 whose disclosure is incorporated here by reference as if fully set forth. A thermal lock assembly 16 is made from a series of curved segments 18 that sit in a conforming groove or grooves 20 in component 12. Optionally, the illustrated design can be reversed from the orientation of FIGS. 2 and 3 within the scope of the invention. In the reverse orientation the segments can be in component 10 instead of 12 and the mating profiles 22 and 24 would be reversed from the manner displayed in FIGS. 2 and 3. Preferably the profiles 22 and 24 are portions of a thread pattern although other projection and depression combinations can be used. This includes the segments 18 simply changing dimension to extend into a recess in the opposing member. The segments are made of a shape memory alloy that below the critical temperature is in the locked position of FIG. 3 but above the critical temperature reverts to the unlocked position of FIG. 2.

Also shown in FIG. 1 is a non-thermal lock 25 which in one case is one or more shear pins that straddle components 10 and 12. The non-thermal lock 25 holds the components 10 and 12 against relative movement during other operations but is lacking in sufficient strength to resist the thermal stresses when fluid is pumped through passage 26 while there is still a need for proper spacing out for the components 10 and 12 to remain locked against relative axial movement.

In operation, the components 10 and 12 are at ambient temperature when run into a well. The thermal lock 16 is in the FIG. 3 position. As exposure to warm well fluids continues the thermal lock 16 releases as in the FIG. 2 position as the temperature exposure above the critical temperature has the segments in the enlarged dimension of FIG. 2. At this time the non-thermal lock is still functional and normal operations of the method can continue without fear of changing the length of the telescoping connection from relative axial movement between the components 10 and 12. Certain jarring loads can still be resisted by the non-thermal lock. However, as the fluid pumping starts, so does the axial shrinkage. Since it is a thermal effect it takes some time to happen. While component shrinkage starts on the outset of cooling, the non-thermal lock 25 can resist that level of stress until such time as there is enough dimensional change for the segments 18 so that profiles 22 and 23 engage. From that point on for the duration of the fluid pumping, the thermal lock through components 18 takes the shear loading. The capacity of the thermal lock is orders of magnitude above the non-thermal lock and the stress imposed during pumping the cooler fluid would otherwise cause the non-thermal lock 25 to fail if the thermal lock assembly 16 were not in the lock position of FIG. 3. After the pumping operation the non-thermal lock 25 is still operational. Eventually when all other steps requiring the components 10 and 12 to hold their relative positions are done then the non-thermal lock is overcome with force, string manipulation or pressure and the telescoping joint is put into service where components 10 and 12 can slide axially relative to each other. While the latter is true for a shear screw embodiment, another embodiment could have a non-thermal lock that is defeated before the pumping operation. This non thermal lock could be activated by pressure or tool string manipulation. The reason this alternate works is that there are not any loads, other than the thermal contraction which could cause the, in this case, expansion joint to translate.

Some applications of the above described system can be an alternative to shear to release packers or anchor or snap latches.

The above description is illustrative of the preferred embodiment and many modifications may be made by those skilled in the art without departing from the invention whose scope is to be determined from the literal and equivalent scope of the claims below.

I claim:

1. A method, comprising:
providing a bottom hole assembly with a telescoping joint having relatively movable components that need to be axially locked before being put into production;
providing a thermally actuated lock in tandem with a non-thermally actuated lock on the telescoping joint between said components;
pumping fluid through said telescoping joint that is colder than surrounding well fluid as a part of a completion operation;
using said pumping to set the thermal lock between said components to protect said non-thermally actuated lock from unlocking during the completion operation;
performing the completion operation with said pumping with said non-thermally actuated lock protected from release by said thermally actuated lock on the telescoping joint;
stopping said pumping to defeat said thermally actuated lock;
unlocking said non-thermally actuated lock with said thermally actuated lock defeated;
producing through said telescoping joint operative to change length as needed.

2. The method of claim 1, comprising:
using a shape memory material for a locking member in said thermal lock.

3. The method of claim 1, comprising:
using at least one segment that changes dimension with temperature disposed between said components as said thermal lock.

4. The method of claim 3, comprising:
providing a surface treatment on said segment to selectively engage a mating pattern on an opposing component.

5. The method of claim 4, comprising:
using a thread or grooves as said surface treatment.

6. The method of claim 3, comprising:
allowing said segment to enter a recess in an opposing component when changing dimension.

7. The method of claim 3, comprising:
using a shape memory alloy for said segment.

8. The method of claim 3, comprising:
making said at least one segment a c-ring.

9. The method of claim 3 comprising:
providing a plurality of segments as said at least one segment.

10. The method of claim 1, comprising:
disposing said segment in an annular space between said components.

11. The method of claim 1, comprising:
running in with said thermal lock engaging said components.

12. The method of claim 11, comprising:
using well fluid temperature to release said thermal lock from one of said components.

13. The method of claim 12, comprising:
reducing temperature in said components with said pumping so as to engage said thermal lock to hold said component together.

14. The method of claim 13, comprising:
defeating said non thermal lock with force, string manipulation or pressure after said reducing temperature.

15. The method of claim 1, comprising:
defeating said non thermal lock with force, string manipulation or pressure.

16. The method of claim 1, comprising:
making said components part of a packer or an anchor or snap latch.

* * * * *